US006775447B2

(12) United States Patent
Nicholson et al.

(10) Patent No.: US 6,775,447 B2
(45) Date of Patent: Aug. 10, 2004

(54) ALL FIBER LOW NOISE SUPERCONTINUUM SOURCE

(75) Inventors: Jeffrey W. Nicholson, Chatham, NJ (US); Man Fei Yan, Berkeley Heights, NJ (US)

(73) Assignee: Fitel USA Corp., Norcross, GA (US)

( * ) Notice: Subject to any disclaimer, the term of this patent is extended or adjusted under 35 U.S.C. 154(b) by 160 days.

(21) Appl. No.: 10/251,464

(22) Filed: Sep. 20, 2002

(65) Prior Publication Data

US 2004/0057682 A1 Mar. 25, 2004

(51) Int. Cl.$^7$ ................................................. G02B 6/00
(52) U.S. Cl. .......................... 385/122; 385/123; 372/21
(58) Field of Search ................................ 385/122, 123, 385/124, 96, 97, 98, 99; 398/81, 148; 372/21; 359/237

(56) References Cited

U.S. PATENT DOCUMENTS

| | | | | |
|---|---|---|---|---|
| 6,381,391 B1 | * | 4/2002 | Islam et al. | 385/123 |
| 6,480,656 B1 | * | 11/2002 | Islam et al. | 385/123 |
| 6,603,910 B2 | * | 8/2003 | Islam et al. | 385/123 |
| 2002/0168161 A1 | * | 11/2002 | Price et al. | 385/123 |
| 2003/0012495 A1 | * | 1/2003 | Islam et al. | 385/123 |
| 2003/0128414 A1 | * | 7/2003 | Watanabe et al. | 359/237 |
| 2003/0152346 A1 | * | 8/2003 | Aso et al. | 385/123 |
| 2004/0005153 A1 | * | 1/2004 | Watanabe | 398/148 |
| 2004/0028355 A1 | * | 2/2004 | Yu et al. | 385/122 |
| 2004/0032887 A1 | * | 2/2004 | Ahmadvand et al. | 372/21 |

OTHER PUBLICATIONS

Nishizawa et al, Generation and characterization of widely broadened super continuum using highly nonlinear fibers and fiber laser, Mar. 2002, OFC 2002, Wednesday Afternoon, pp. 310–312.*

M. Nakazawa, et al, Coherence Degradation in the Process of Supercontinuum Generation in an Optical Fiber, Optical Fiber Technology, v. 4, 215–23 (1998). no month available.

N. Nishizawa, et al, Widely Broadened Super Continuum Generation Using Highly Nonlinear Dispersion Shifted Fibers and Femtosecond Fiber Laser, Japan Journal of Applied Physics, v. 40, pt. 2, No. 4B (2001). no month available.

J.M. Dudley, et al, Coherence Properties of Supercontinuum Spectra Generated in Photonic Crystal and Tapered Optical Fibers, Optics Letters, v. 27, No. 13 (Jul. 1, 2002).

Crystal Fibre, Supercontinuum Generation in Photonic Crystal Fibers, Application Note (Nov. 12, 2001).

S. Coen, et al., Supercontinuum Generation in Photonic Crystal Fibers, Internet Address "http://www.imm.dtu.dk/undervisning/phdschool/calendar2001/Workshop_NPC/Coen.html" no date available.

* cited by examiner

Primary Examiner—Jared J. Fureman
(74) Attorney, Agent, or Firm—Law Office of Leo Zucker

(57) ABSTRACT

An optical fiber suitable for generation of a supercontinuum spectrum when light pulses of femtosecond ($10^{-15}$ sec.) duration are launched at a certain wavelength into the fiber. The fiber includes a number of sections of highly non-linear fiber (HNLF) wherein each section exhibits a different dispersion at the wavelength of the launched light pulses. The fiber sections are joined, for example, by fusion splicing the sections in series with one another so that the dispersions of the sections decrease from an input end to an output end of the fiber. In the disclosed embodiment, a low noise, coherent supercontinuum spanning more than one octave is generated at the output end of the fiber when pulses of light of 188 fs duration are launched into the fiber at a repetition rate of 33 MHz and with an energy of three nanojoules per pulse.

17 Claims, 9 Drawing Sheets

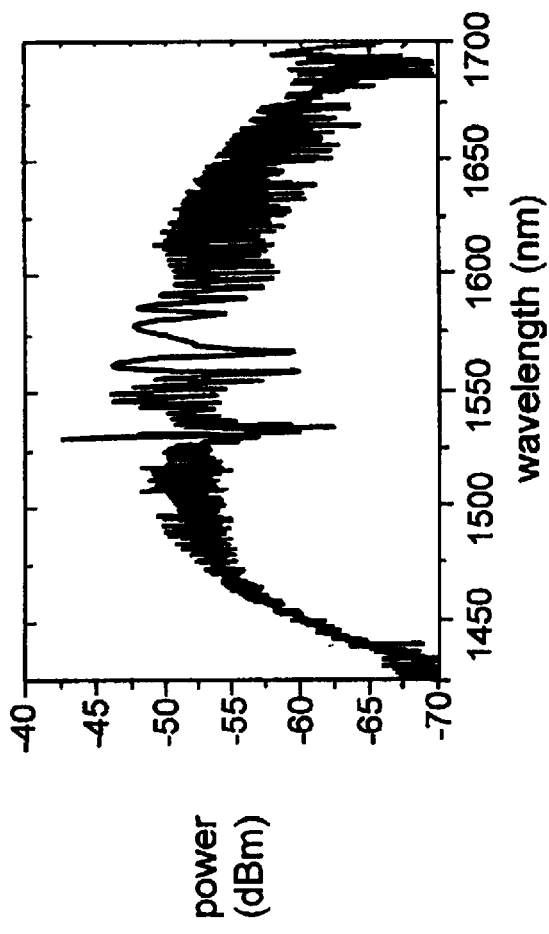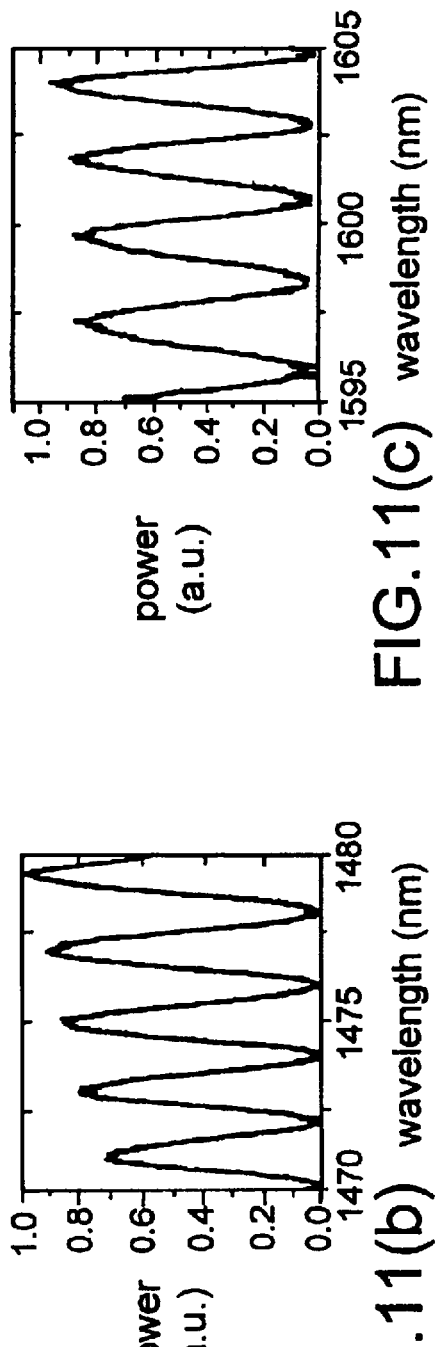
FIG.11(a)
FIG.11(b)
FIG.11(c)

ALL FIBER LOW NOISE SUPERCONTINUUM SOURCE

BACKGROUND OF THE INVENTION

1. Field of the Invention

This invention relates to the generation of supercontinuum by launching pulses of light from a light source into an optical fiber structure.

2. Discussion of the Known Art

There are applications in the fiber optics field in which a high power, low noise, broadband light source is of particular interest. For example, efforts are now being made toward spectral slicing wherein a common light source is used to generate a multitude of wavelength division multiplexed (WDM) signals. Such an application thus has the potential for replacing many lasers with a single light source. Device characterization, e.g., dispersion measurements made on specialty fibers or the determination of transmission characteristics of gratings, may also be accomplished with such a broadband source.

Supercontinuum generation involves the launching of relatively high power light pulses into an optical fiber or microstructure, wherein the pulse light undergoes significant spectral broadening due to nonlinear interactions in the fiber. Current efforts at supercontinuum generation, typically performed using light pulses having durations on the order of picoseconds ($10^{-12}$ sec.) in kilometer lengths of fiber, have shown degradation of coherence in the generating process, however. That is, additional noise is introduced into the system during the spectral broadening process. See M. Nakazawa, et al., Coherence Degradation in the Process of Supercontinuum Generation in an Optical Fiber, 4 Optical Fiber Technology, at 215–23 (1998).

Supercontinuum light of wavelengths spanning more than an octave have been generated in microstructured and tapered optical fibers by launching light pulses having durations on the order of femtoseconds ($10^{-15}$ sec.) into the ends of such fibers. The extreme spectra thus produced is useful, e.g., for measuring and stabilizing pulse-to-pulse carrier envelope phase and for high precision optical frequency combs. Efforts at modeling the continuum in microstructured fibers based on a modified nonlinear Schrodinger equation have been aimed at understanding the fundamental processes involved in the spectrum generation, and show that coherence is better maintained as the launched pulses are shortened in duration from the order of picoseconds to femtoseconds.

A relatively new type of germanium doped silica fiber with low dispersion slope and a small effective area, referred to herein as highly nonlinear fiber or HNLF, has recently been developed. Although the nonlinear coefficients of HNLF are still smaller than those obtained with small core microstructured fibers, the coefficients are still several times those of standard transmission fibers due to the small effective area of HNLF. Supercontinuum generation using a HNLF and a femtosecond fiber laser has been reported. See N. Nishizawa, et al., Widely Broadband Super Continuum Generation Using Highly Nonlinear Dispersion Shifted Fibers and Femtosecond Fiber Laser, 40 Japan Journal of Applied Physics, Part 2, at pages L365 to L367 (2001). As far as is known, however, generation of a low noise, coherent, octave spanning continuum has not been achieved using an all fiber device.

SUMMARY OF THE INVENTION

According to the invention, an optical fiber suitable for generation of a supercontinuum spectrum at an output end of the fiber when pulses of light from a light source of a certain wavelength are launched into an input end of the fiber, includes a number of optical fiber sections each formed of a highly non-linear fiber (HNLF) and having a zero dispersion wavelength that is within about +/−200 nanometers (nm) of the light source wavelength. Each of the fiber sections has a different dispersion at the light source wavelength and an effective area ($A_{eff}$) of between 5 $\mu m^2$ and 15 $\mu m^2$ at such wavelength, a dispersion slope of between −0.04 ps/nm²-km and 0.04 ps/nm²-km at such wavelength, and a nonlinear propagation coefficient ($\gamma$) of at least 5 $W^{-1}km^{-1}$. The fiber sections are operatively connected, e.g., fusion spliced in series with one another from the input end to the output end of the optical fiber.

For a better understanding of the invention, reference is made to the following description taken in conjunction with the accompanying drawing and the appended claims.

BRIEF DESCRIPTION OF THE DRAWING

In the drawing:

FIG. 11(a) shows an interference spectrum of continuum generated in the hybrid fiber of the invention;

FIG. 11(b) shows interference fringes in the spectrum of FIG. 11(a) in a wavelength region about 1475 nm;

FIG. 11(c) shows interference fringes in the spectrum of FIG. 11(a) in the wavelength region about 1600 nm.

DETAILED DESCRIPTION OF THE INVENTION

Figure 1:
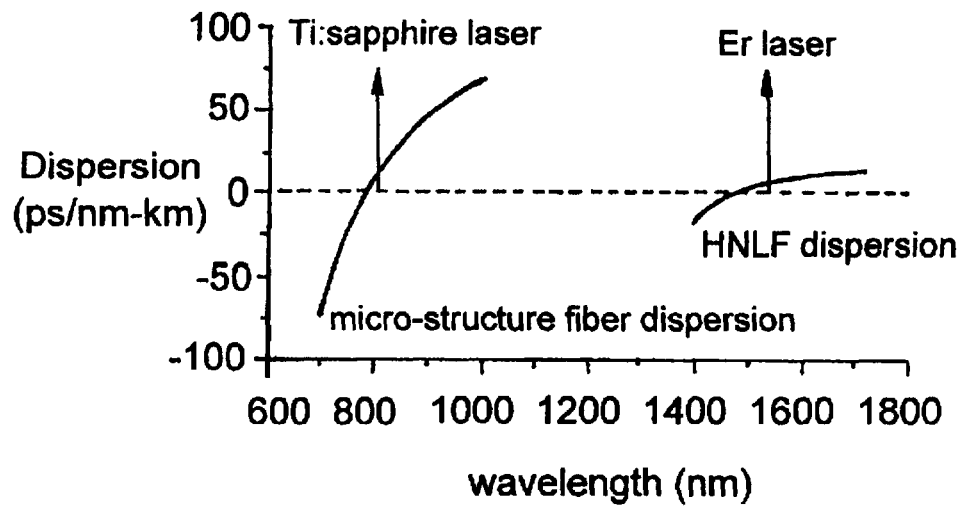
FIG. 1 is a graph showing dispersion of a typical small core microstructure or tapered fiber in relation to the wavelength of a Ti:sapphire laser, compared to dispersion in a HNLF in relation to the wavelength of an Er fiber laser.

FIG. 1 shows, at the left side of the figure, a relationship between wavelength of a generating pulse and fiber dispersion in a continuum generating device including a Ti:Sapphire laser and an air-silica microstructure fiber. Numerical models show that the broadest continuum is generated when the wavelength of the laser light pulse is in the anomalous dispersion regime of the fiber. The pulse initially begins to self-Raman shift to longer wavelengths. Then, as higher order solitons break up, parametric four-wave mixing causes frequencies to be generated at wavelengths shorter than the zero dispersion wavelength of the fiber.

FIG. 1 also shows, at the right, a relationship between wavelength of light pulses of femtosecond duration from an Erbium laser, and dispersion in a HNLF into which the pulses are launched. The curve at the right in FIG. 1 looks similar to that at the left but shifted to longer wavelengths, and recent experiments have shown supercontinuum generation at wavelengths of from 1.1 $\mu$m to 2.1 $\mu$m in only a few meters of HNLF. As demonstrated below, continuum generation in HNLF can be extended beyond one octave of bandwidth by altering the dispersion along the length of the fiber in a predetermined manner.

A typical dispersion slope for HNLF is 0.024 ps/nm²-km at a wavelength of 1550 nm. An effective area $A_{eff} \approx 13.9 \mu m^2$ at 1550 nm, and a nonlinear coefficient, $\gamma \approx 8.5$ W$^{-1}$ km$^{-1}$, were calculated from a measured index profile. Fibers with $\gamma$ at much higher values have been produced, however. Although the nonlinearity may be less than that obtainable with microstructured fiber, HNLF does offer a number of advantages.

For example, HNLF is based on standard germanium and fluorine doped silica fiber. As such, HNLF can be fusion spliced to standard single mode fiber (SMF). Splice losses from HNLF to SMF were measured to be typically less than 0.2 dB, and varied by less than 0.02 dB at wavelengths from 1500 nm to 1600 nm. Furthermore, HNLF has lower loss compared to microstructured fiber; measured attenuation was only 1.1 dB/km at 1550 nm for HNLF used in the present experiments, and HNLFs typically have attenuations near 0.7 dB/km. Finally, HNLF is single mode at those pulse wavelengths which are used to generate supercontinuum in the fiber, as opposed to microstructured fibers which are multi-mode at 800 nm.

Figure 2:
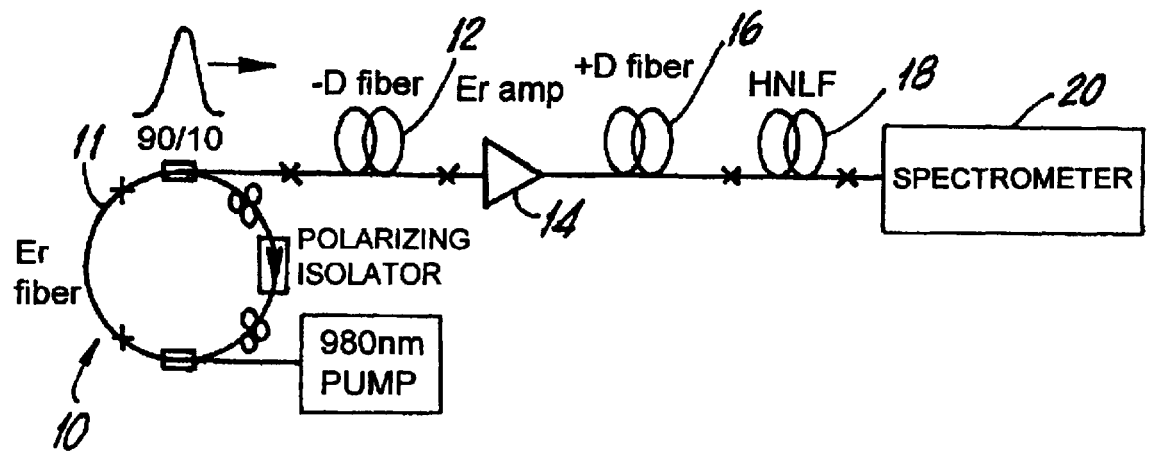
FIG. 2 is a schematic diagram of an optical configuration used for generating supercontinuum in a highly non-linear fiber (HNLF) according to the invention.

FIG. 2 shows a test configuration that was used in the present experiments. A laser source 10 including a passively modelocked, stretched pulse Erbium fiber laser 11 produced pulses of light at wavelengths centered at 1550 nm with a pulse repetition rate of approximately 33 MHz. The average power of the light pulses was 7 mW. The full width half maximum (FWHM) duration of each pulse was measured to be 188 femtoseconds (fs), based on a full phase retrieval from an amplitude unbalanced, second order interferometric correlation plus the pulse spectrum. To boost average power, the light pulses output from the laser 11 were stretched in a negative dispersion fiber 12 (type HSDK available from OFS Denmark), amplified in an Erbium amplifier 14, and re-compressed in a positive dispersion, standard single mode fiber 16 the output end of which was fusion spliced to an input end of the HNLF 18. For low power experiments discussed later below, output light pulses were launched directly from the fiber laser 11 into one end of a length of HNLF 18 under test. Average powers of up to 50 mW were obtained, although at those power levels significant self phase modulation was observed in the pulse spectrum at the output of the positive dispersion fiber 16.

Generated optical spectrum from 1 $\mu$m to 1.77 $\mu$m was observed with an optical spectrum analyzer (OSA) 20 (ANDO model AQ-6315B). For wavelengths longer than 1.7 $\mu$m, the optical spectrum was measured using a scanning monochrometer and a TE cooled PbS detector (not shown). In the region from 1.5 $\mu$m to 1.77 $\mu$m the spectra from the two devices were compared. Although the measurements agreed in terms of large structures in the spectrum, the OSA showed a much finer structure in the spectrum on the scale of a few nanometers, whereas spectra measured with the PbS detector lacked such fine structure. This was attributed to the slow (seconds) response time of the PbS detector which tended to average out fine structures at scan speeds that were used in the present experiments.

Figure 3A:
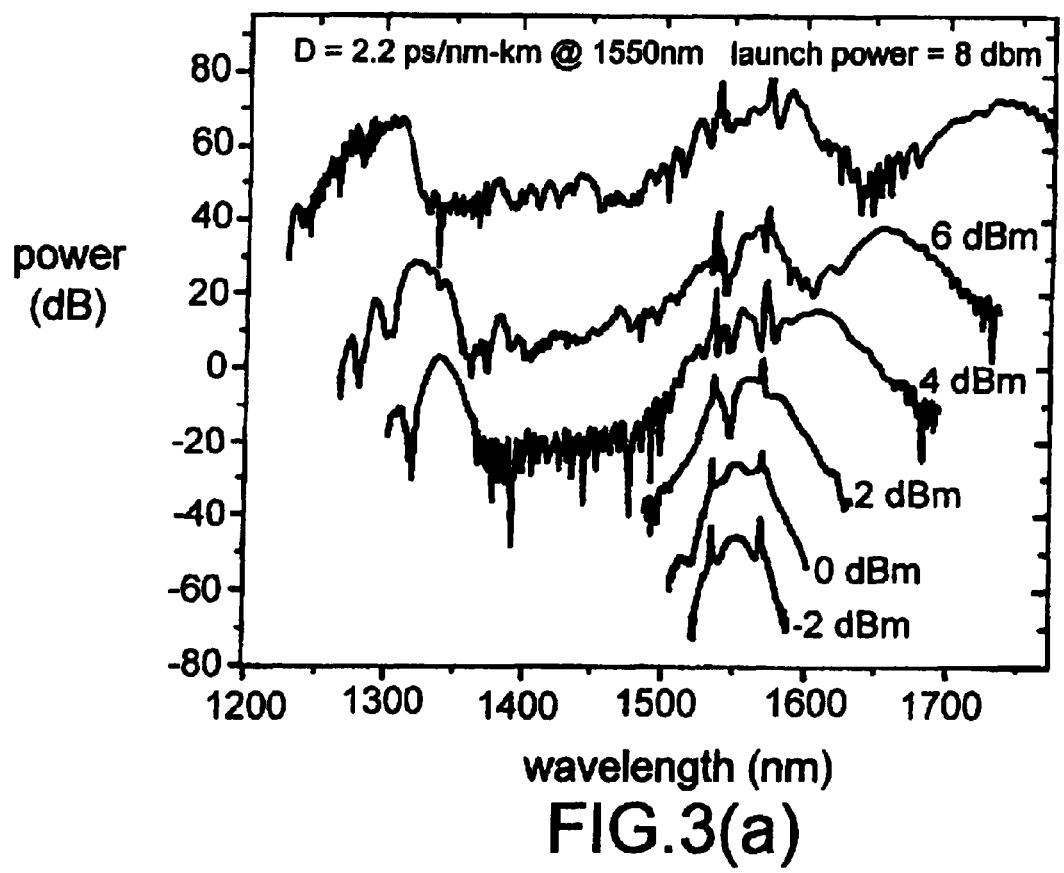
FIG. 3(a) is a graph showing growth of supercontinuum for low pulse powers in a 10 meter length of positive dispersion HNLF.

Separate lengths of HNLF 18 having a zero dispersion wavelength of 1460 nm and dispersions varying from negative to positive values at the laser source wavelength of 1550 nm, were drawn by changing the fiber diameter slightly during draw from a single fiber preform. Spectra generated by light pulses supplied directly from the laser 11 into a ten meter length of +2.2 ps/nm-km dispersion (at 1550 nm) HNLF as a function of launch power, are shown in FIG. 3(a). The spectra are offset vertically for clarity. Eight dBm of average power for this pulse train corresponds to 190 pJ/pulse, or a peak power of 1.02 kW. The sharp spikes in the spectrum at −2 dBm are soliton sidebands from the laser source itself. Polarization maintaining fiber was not used in the experiments.

As the launch power increases, a self Raman-shifted pulse is seen breaking off from the main pulse. By contrast, supercontinuum spectra observed in non-polarization maintaining fiber typically do not show a clear self-Raman shifted pulse. As launch power increases further, a second pulse breaks off, and new components corresponding to FWM frequencies appear at shorter wavelengths than the fiber's zero dispersion wavelength of 1460 nm.

Figure 3B:
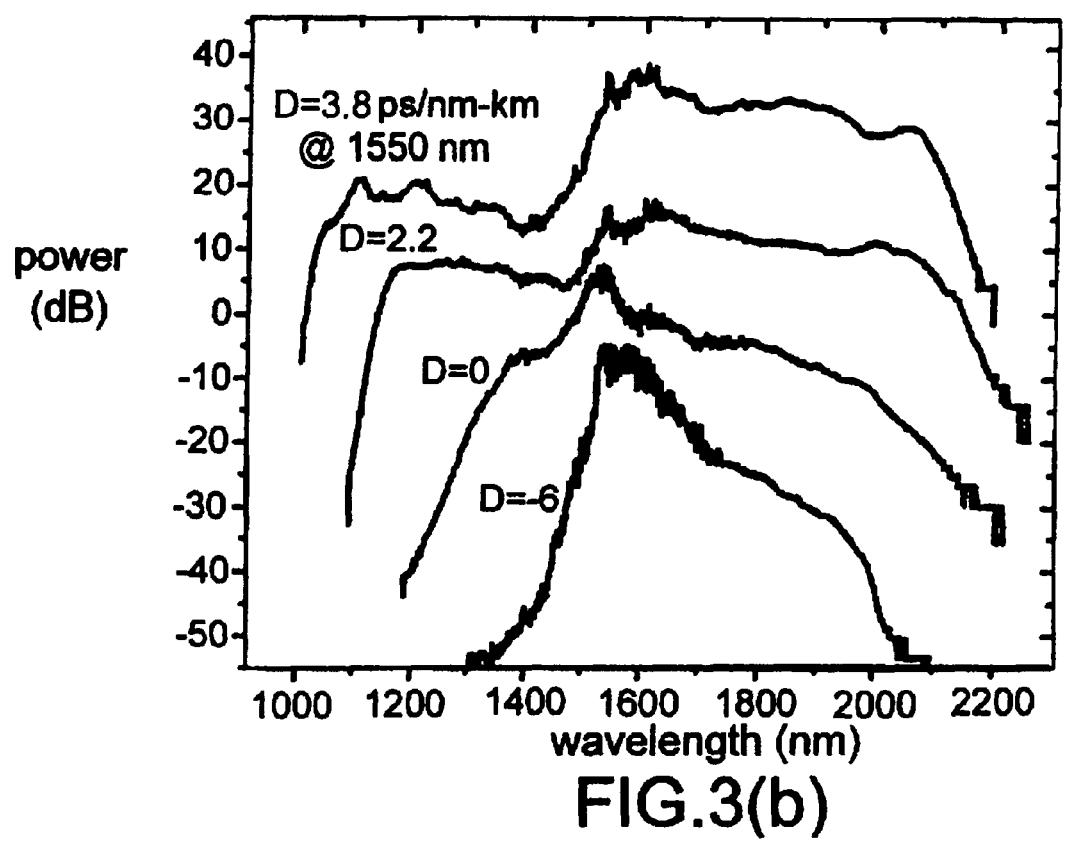
FIG. 3(b) is a graph showing supercontinuum generated in a HNLF as a function of fiber dispersion.

The spectrum generated as a function of fiber dispersion at a full launch power of 50 mW is shown in FIG. 3(b). At the higher powers, much of the structure observed at lower powers in FIG. 3(a) is smoothed out. The narrowest spectra is seen for the HNLF having a negative dispersion (D=−6) at 1550 nm. As the dispersions of the fibers increase the continuum spectrum broadens, but the relative power at wavelengths less than the zero dispersion wavelength (1460 nm) becomes weaker. Separate lengths of HNLF as long as 600 meters were used to generate the supercontinuum. When using such longer lengths of HNLF, the shoulder seen at shorter wavelengths is substantially filled in, but (i) the short wavelength edge of the spectrum did not extend any further, and (ii) the long wavelength edge of the spectrum became attenuated at wavelengths longer than 2 $\mu$m due to linear attenuation in the fibers.

While it may not be possible to tune the dispersion during draw for relatively such short (e.g., 10 meter) lengths of fiber, it has been discovered that sections of HNLF each of which has a different dispersion at the wavelength of the light pulses from the laser source 10, can be fusion spliced to one another with as little as 0.02 dB loss to form what is referred to herein as a "hybrid" HNLF. Accordingly, a predetermined dispersion map may be implemented by splicing lengths of HNLF each having a different diameter (i.e., dispersion) to one another.

The sections of HNLF used to form the present hybrid HNLF should preferably have a zero dispersion wavelength that is within about +/−200 nm of the wavelength of the launched light pulses, an effective area ($A_{eff}$) of between 5 $\mu m^2$ and 15 $\mu m^2$ at the launched light pulse wavelength, a dispersion slope of between −0.04 ps/nm$^2$-km and 0.04 ps/nm$^2$-km at such wavelength, and a nonlinear propagation coefficient ($\gamma$) of at least 5 $W^{-1}km^{-1}$.

EXAMPLE 1

A six meter long hybrid HNLF was constructed by fusion splicing four lengths or sections of HNLF each 1.5 meters long in series with one another. Each section of HNLF was of a different dispersion at the wavelength of the light pulses generated by the laser source 10, and had an effective area, dispersion slope and nonlinear propagation coefficient selected to be within the above mentioned ranges. The dispersions of the fiber sections decreased successively from a positive dispersion end of the hybrid fiber to a negative dispersion end, with the four sections of HNLF having dispersions of, in order; D=+3.8, +2.2, 0, and −6 ps/nm-km at the launched light pulse wavelength of 1550 nm.

Figure 4:
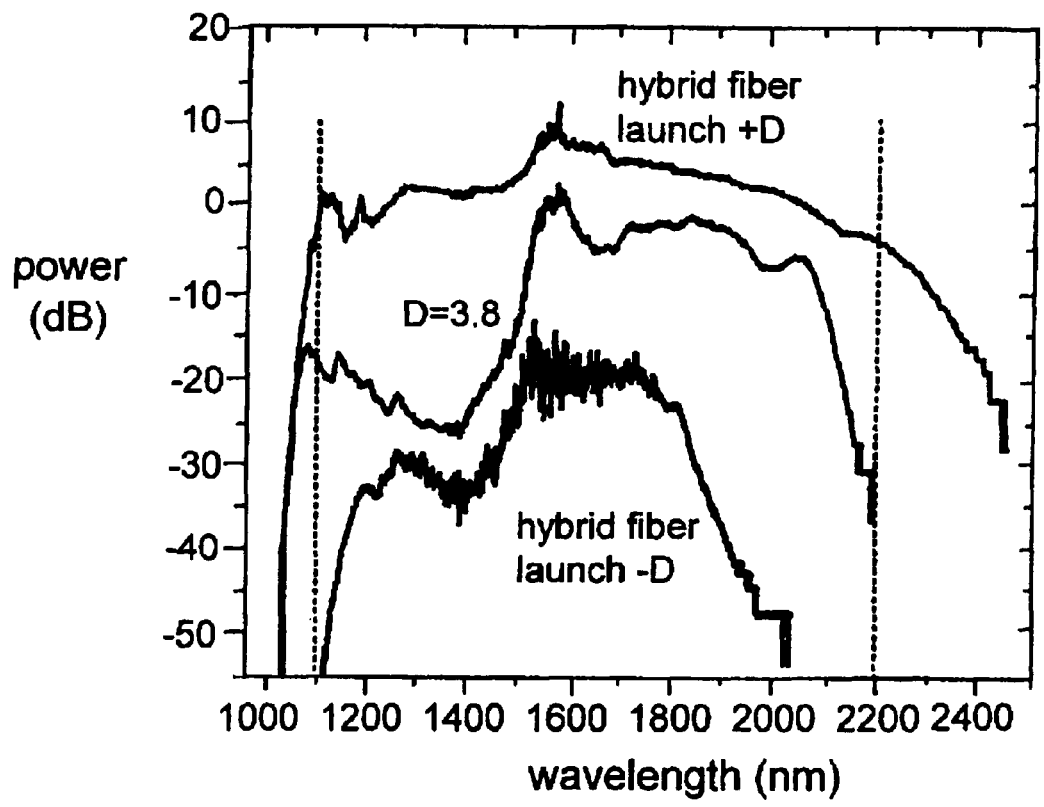
FIG. 4 is a graph showing supercontinuum generated from a 10 meter length of positive dispersion HNLF, compared to that obtained with a six meter length of HNLF according to the invention with light pulses launched into the fiber in either direction.

FIG. 4 shows the spectra generated by launching light pulses into either one of the two opposite, positive and negative dispersion ends of the hybrid fiber. In addition, the continuum generated by a 10 meter length of HNLF with a constant positive D=3.8 ps/nm-km is shown in FIG. 4 for purposes of comparison. The launched light pulse energy was about three nanojoules (3 nJ) per pulse, equating to about ten kilowatts (10 kW) peak pulse power.

Continuum generated by launching into the positive dispersion end of the hybrid fiber spanned from 1.073 $\mu m$ to 2.311 $\mu m$ at the −20 dB points. At points 15 dB down from the peak, the continuum still spanned more than an octave of bandwidth. As far as is known, this is the broadest spectrum to have been generated from an all fiber device. As seen in FIG. 4, the spectrum generated with the hybrid HNLF is substantially broader than that generated by the D=+3.8 ps/nm-km fiber, even though the hybrid fiber is four meters shorter. In addition, the continuum from the hybrid HNLF is much flatter and does not show a power drop at wavelengths shorter than the zero dispersion wavelength of 1460 nm.

Launching into the positive dispersion end of a single, dispersion decreasing fiber (DDF) has been shown to produce an adiabatic compression of solitons. By contrast, launching into the negative dispersion end of the fiber initially leads to pulse broadening. Consequently, the continuum in FIG. 4 generated by launching into the negative dispersion end of the hybrid fiber is considerably narrower than that generated by launching into the positive dispersion end of the fiber.

Spanning an octave of spectrum is important for applications such as pulse-to-pulse carrier envelope phase control. Also, an all fiber continuum can provide a compact source for high precision optical combs. The ability operatively to join lengths of HNLF each having different dispersions with low loss (e.g., fusion) splices, enables the implementation of a predetermined dispersion map along the overall length of the continuum generating fiber. The present hybrid fiber generates a relatively broad and flat continuum, and exhibits directional dependance in the continuum generation. Optimization of the dispersion map through nonlinear Schrodinger modeling of the propagation of the light pulses through the hybrid fiber may enable generation of an even broader continuum, or the ability to generate other desirable features in the output spectrum.

As mentioned earlier, spectral slicing of supercontinua has been proposed as a means for generating many different wavelength division multiplexed (WDM) signals from a single laser source, wherein light pulses of durations on the order of picoseconds ($10^{-12}$ sec.) are launched into continuum generating fibers having lengths on the order of kilometers. To use a spectrally sliced, supercontinuum source in a WDM system, coherence must be maintained and any excess noise introduced by the continuum generation process should be kept at a minimum. Anomalous dispersion fiber is capable of generating a broad continuum because it maintains soliton pulses and, hence, high peak power during the generation process. Coherence in a supercontinuum generated in an anomalous dispersion HNLF using light pulses of picosecond (ps) duration can not be maintained, however. Dispersion decreasing fiber (DDF) generates a broader, flatter continuum than anomalous or negative dispersion fiber, but even with DDF coherence is not maintained over the full length of the continuum.

Since degradation in coherence causes increased timing jitter and amplitude fluctuations, it is essential that coherence be maintained if a generated supercontinuum spectrum is used as a source for spectral slicing. Loss of coherence in continuum generation in short lengths (i.e., several centimeters) of small core microstructure fibers when pumped with 800 nm wavelength, Ti:sapphire laser pulses, has been recently modeled. The numerical simulations, which are based on a modified nonlinear Schrodinger equation, show that coherence is maintained better as the launched pulse becomes shorter. For pulses shorter than 100 femtoseconds, no loss of coherence was observed over the entire length of the continuum. For launched pulses longer than 150 fs, however, coherence degraded severely.

The octave spanning supercontinuum generated by the hybrid HNLF described herein will now be characterized, using low power pulses applied directly from the output of the fiber laser 11 in FIG. 2. A variety of techniques are used to test noise properties of the continuum generated by the hybrid fiber, including long-term amplitude stability, RF measurements, and cross-correlations between independently generated continua. It is shown below that the present continuum generation process does not introduce observable coherence degradation, and is suitable for spectral slicing applications or as a source for device characterization such as in dispersion or attenuation measurements.

EXAMPLE 2

Continuum Generation in HNLF

The passively modelocked Erbium laser source 10 in FIG. 2, whose operation was based on non-linear polarization rotation, was used as a pulse source. The laser source operated at a fundamental light pulse repetition rate of approximately 33 MHz and with an average power of up to 7 mW. A retrieval from an amplitude unbalanced, second order interferometric correlation plus the pulse spectrum, showed an intensity FWHM light pulse duration of 188 fs.

If a spectrally sliced supercontinuum is used as a WDM source, the initial generating laser must operate at an associated data repetition rate. While the laser source 10 in the present experiments operated at only 33 MHz; high coherence, low timing jitter, and harmonic modelocking of a similar laser at repetition rates of up to one GHz have been demonstrated recently. The present system may therefore be scaled upward to handle most all repetition rates currently of interest in data communication networks.

Figure 9A:
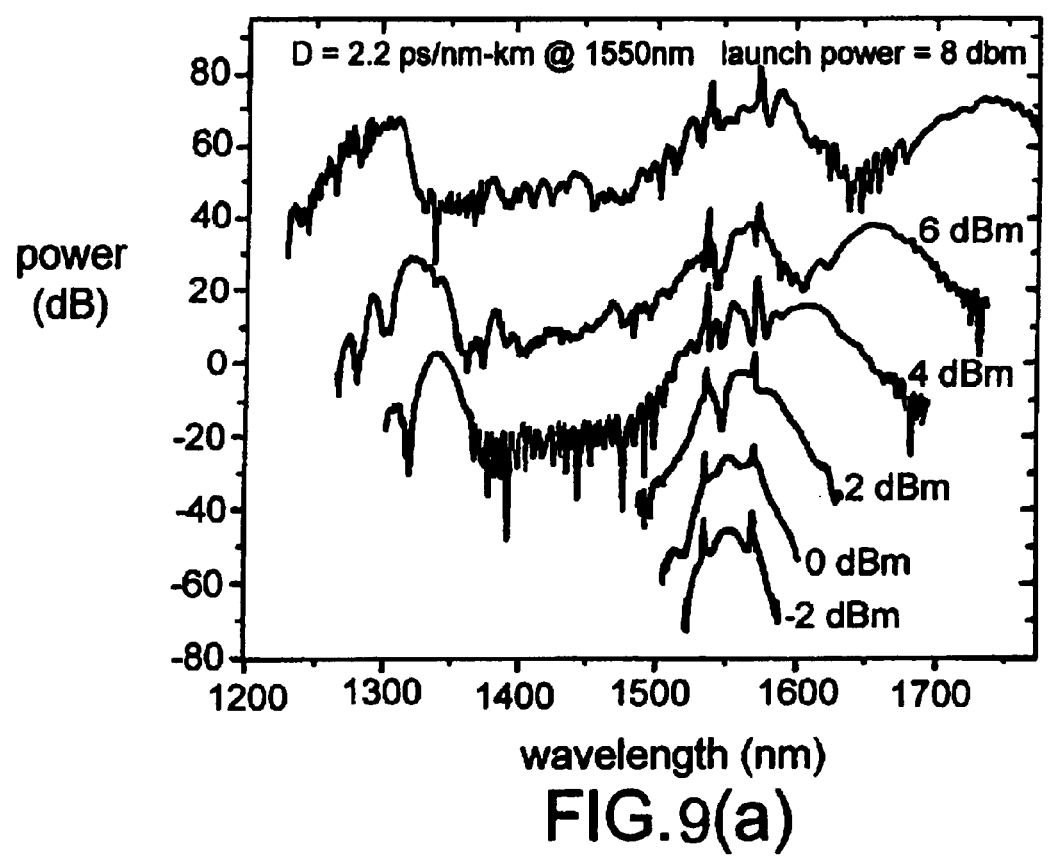
FIG. 9(a) is a graph showing growth of a supercontinuum as a function of launch power for a 10 meter length of positive dispersion fiber.
Figure 9B:
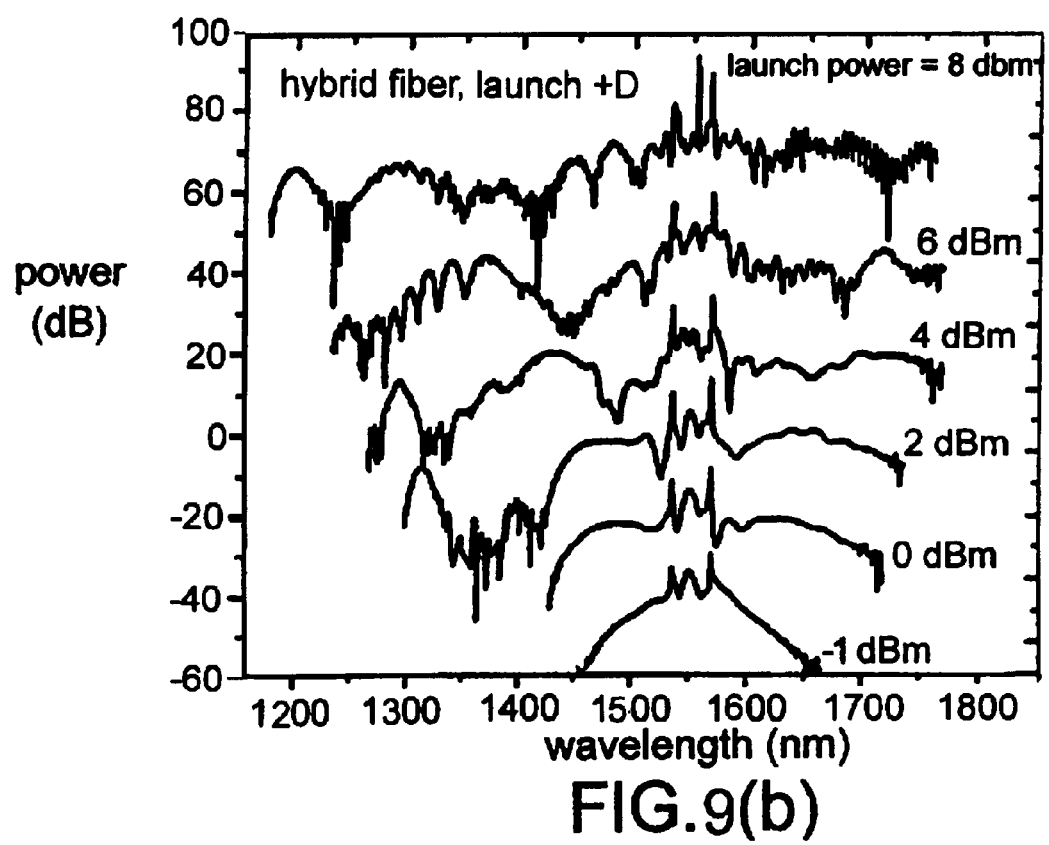
FIG. 9(b) is a graph showing growth of a supercontinuum as a function of launch power for the hybrid HNLF according to the invention.

Continuum generation as a function of launch power is shown in FIG. 9(a) for a 10 meter length of fiber having D=2.2 ps/nm-km, and for the six meter long hybrid HNLF in FIG. 9(b). As mentioned, the spectra were obtained by launching light pulses directly from the fiber laser 11 into ends of the fibers under test, and are offset vertically in the drawing for clarity. As the launch power increases, the 2.2 ps/nm-km fiber (FIG. 9(a)) shows the same sequence of events as has been described theoretically and measured experimentally in continuum generation at 800 nm in microstructured fiber. At low powers, soliton pulses begin to break off and self-Raman shift to longer wavelengths. At higher powers, four wave mixing components begin to appear at wavelengths shorter than the zero dispersion wavelength of the fiber, as more soliton pulses break off from the main pulse.

By contrast, the spectrum from the hybrid fiber is much more symmetric with respect to the launched light pulse wavelength (1550 nm) at low powers, than the spectrum from the constant +2.2 ps/nm-km fiber. The hybrid fiber spectrum is also flatter, and is substantially broader than that from the positive dispersion fiber at all power levels.

Figure 5:
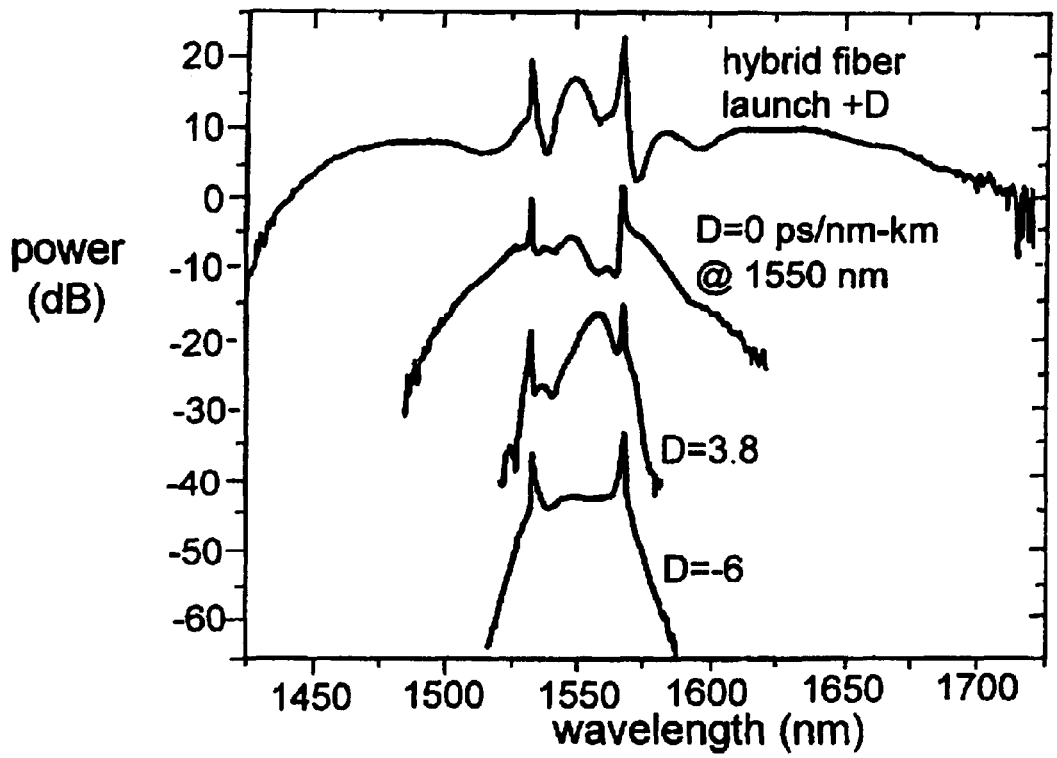
FIG. 5 is a graph showing supercontinuum generated in lengths of HNLFs of different dispersions, at 0 dBm launch power.

Continuum produced by three 10 meter length fibers having different dispersions at the launched light pulse wavelength are shown in FIG. 5 for a launch power of 1 mW (i.e., 0 dBm), together with the continuum from the inventive hybrid HNLF. The launched light pulses had an energy of about 31 picojoules (pJ) per pulse, equating to a peak pulse power of about 150 watts. Sharp peaks seen in the spectra are from soliton sidebands that originate from the fiber laser 11 (FIG. 2) itself.

Again, the spectrum from the hybrid HNLF is much broader than the spectra from the three constant dispersion fibers in FIG. 5. The D=+3.8 ps/nm-km fiber shows the beginning of a soliton pulse breaking off, whereas the negative dispersion (D=−6 ps/nm-km) fiber shows very little spectrum generation at the launch power of 0 dBm. Interestingly, the zero dispersion fiber (D=0) has a symmetrically broadened spectrum, although narrower than that generated by the hybrid HNLF. As noted earlier, however, for very high launch powers the D=0 fiber was found to be limited on the shorter wavelength side of the generated continuum.

Figure 6:
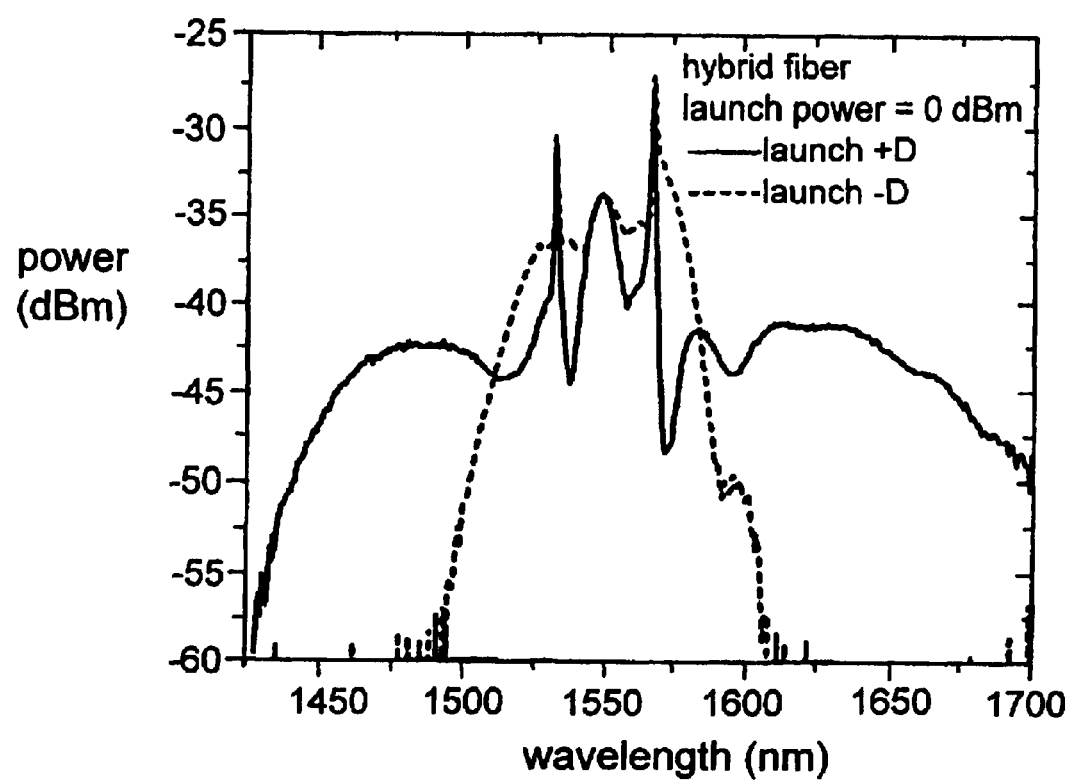
FIG. 6 is a graph showing dependence of a continuum generated by a hybrid HNLF according to the invention on launch direction, at 0 dBm launch power.

FIG. 6 shows generated continuum as a function of the direction of launch in the hybrid HNLF. Whereas launching into the positive dispersion end of the hybrid fiber causes pulse compression and, consequently, a broadened flat spectrum, launching into the negative dispersion end of the fiber initially causes the pulse to spread, and, therefore, relatively little spectrum is generated.

EXAMPLE 3

Measurement of the Continuum Coherence

When applying supercontinuum generation in applications such as spectral slicing and device characterization, noise properties of the generation process must be understood. Measurements made to determine amplitude stability and the electrical spectrum of the continuum generated by the hybrid HNLF, are now presented.

Figure 7A:
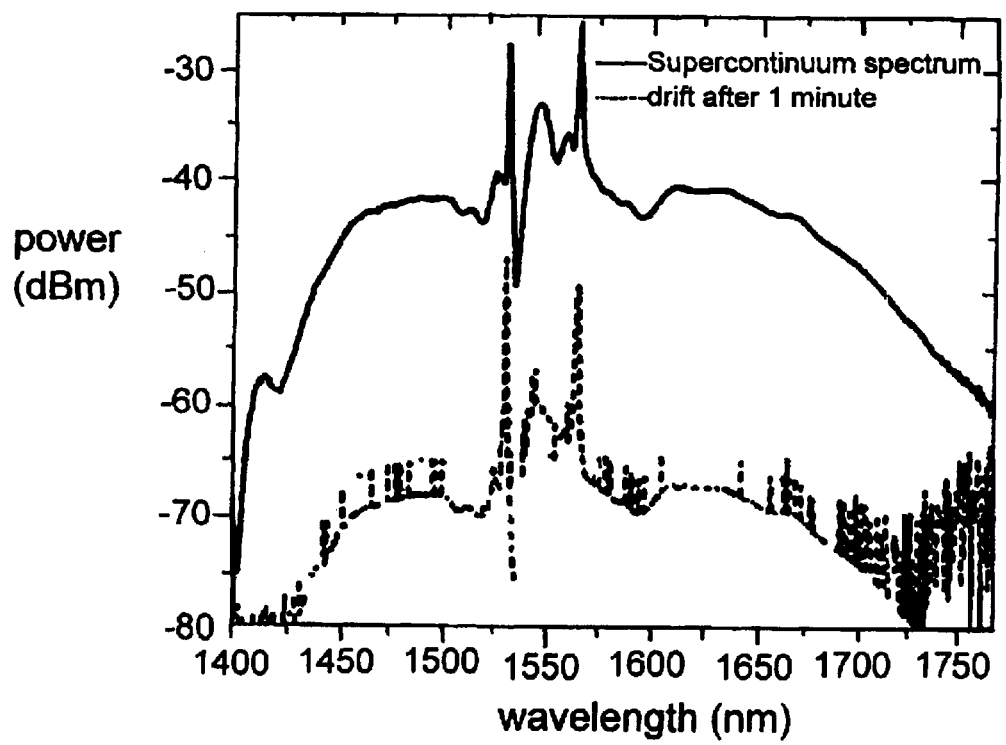
FIG. 7(a) is a graph showing a change in a generated continuum power spectrum after one minute.
Figure 7B:
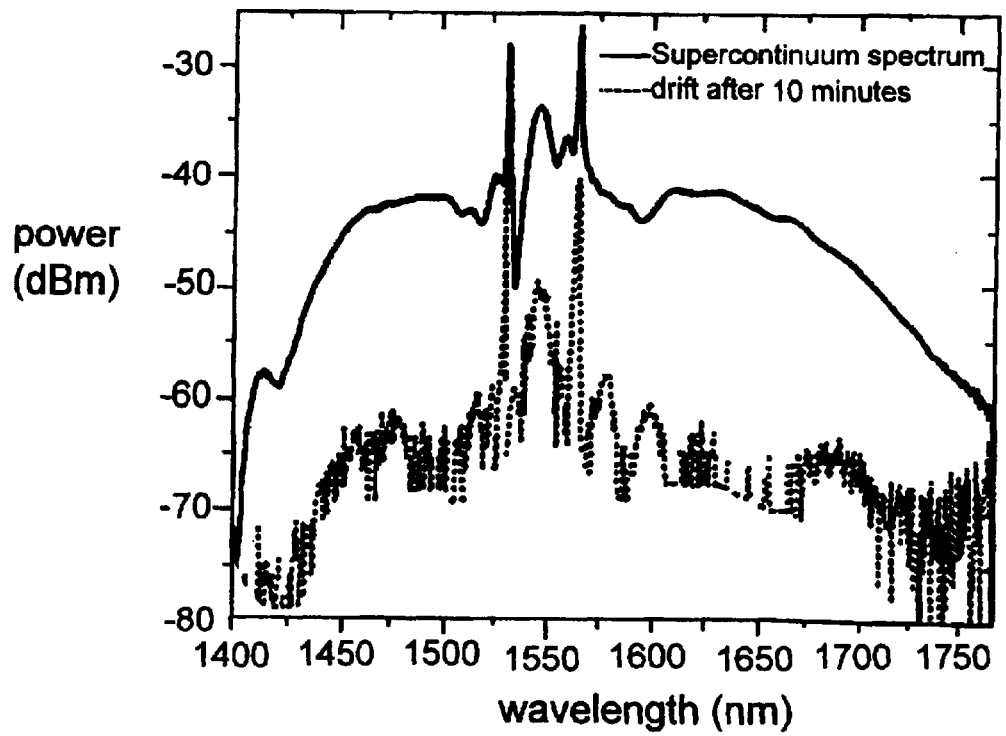
FIG. 7(b) is a graph showing the change in the generated continuum power spectrum after 10 minutes.

A spectrum generated by launching light pulses into the positive dispersion end of the hybrid HNLF with an average power level of 1 mW, is shown in FIGS. 7(a) and 7(b). Although a box was placed over the laser 11 in FIG. 2 to shield it from air flow, it was otherwise unstabilized in the experiments. Successive measurements of the continuum were made at intervals of one minute, and a difference between successive measurements was calculated. The change in the continuum is shown by dashed lines after one minute in FIG. 7(a), and after ten minutes in FIG. 7(b). Measurements were made using a highest OSA resolution of 0.05 nm.

For the measurements separated by one minute intervals in FIG. 7(a), the drift in continuum amplitude was essentially limited by the dynamic range of the OSA except in regions of the soliton sidebands. For longer times, the measurement appeared to be limited by drift in the unstabilized laser pulse. The measurements separated by ten minute intervals in FIG. 7(b) show a largest change in the wavelength region of the generating pulse itself. Even so, the difference in continua measured ten minutes apart is less than 25 dB for most of the wavelength range. This suggests that a continuum based on an environmentally stable laser using, e.g., polarization preserving fiber, should provide excellent long term stability. Such a light source would be ideal for device characterization such as grating transmission or speciality fiber dispersion measurements, where a high power, low noise and broadband light source is highly desirable.

Figure 8:
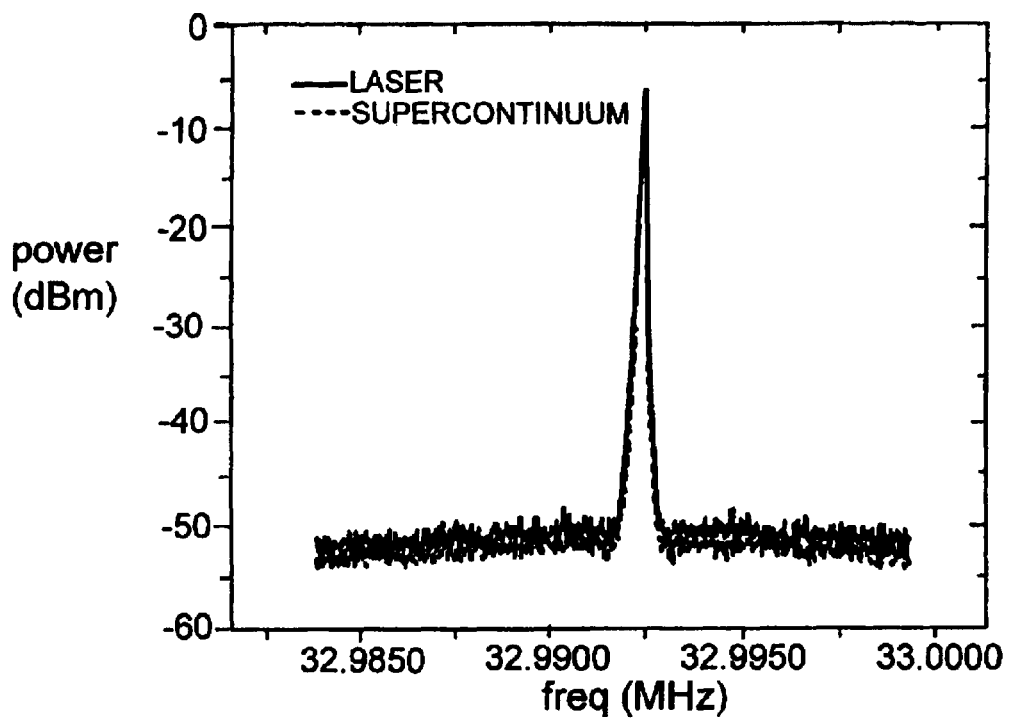
FIG. 8 shows a radio frequency (RF) spectrum of a laser source in FIG. 2, and a generated continuum showing a longitudinal mode beat note.

A photocurrent spectrum produced by a photodetector in response to the light pulses from the laser source 10, was measured with a Lightwave Analyzer (HP series 70000) and is plotted in FIG. 8. The measurement was taken with a resolution bandwidth of 10 Hz and shows a longitudinal mode beat note generated by the laser oscillator. Also shown in FIG. 8 is the electrical spectrum produced by the photodetector in response to the continuum generated in the hybrid fiber, at a maximum launch power of 7 mW corresponding to the topmost power spectrum in FIG. 9(b). Although the optical spectrum shows a significant amount of structure, the structure is stable and no additional background is observed in the electrical spectrum.

The coherence of a light source can be measured quantitatively by way of fringe visibility using an interferometer. If zero delay is provided between two arms of the interferometer, any light source will show strong fringes when amplitude or phase fluctuations (if any) in the light source are correlated by the two arms. Therefore, to determine if the present continuum generating source introduces timing jitter or amplitude fluctuations, any interference measured between two independently generated continuum would be of particular interest.

Figure 10A:
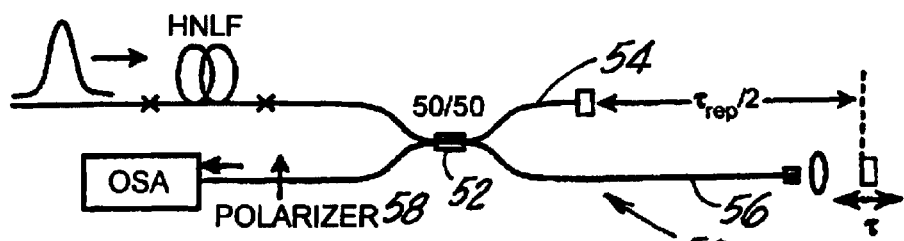
FIG. 10(a) is a schematic diagram of an interferometer measurement configuration used to test for noise and coherence of supercontinuum generated by the hybrid fiber of the invention.

One possible arrangement would split the laser light pulses into two streams, and apply each pulse stream to generate continuum in two different lengths of fiber. Such a configuration would, however, decrease available pump power by a factor of two. In the present experiments, consecutive pulses in the pulse train were interfered with one another by creating an additional delay equal to the repetition rate of the laser in one arm of the interferometer. The measurement configuration used is depicted schematically in FIG. 10(a).

A fiber interferometer 50 was made using a 1550 nm, 3-dB coupler 52. One arm used a metal plated fiber 54 as a reflector. In the other arm, additional fiber 56 was used to achieve a delay equal to the period of the light pulses produced by the laser source. A polarization beam combiner 58 ensured parallel polarization at the output of the interferometer.

Figure 10B:
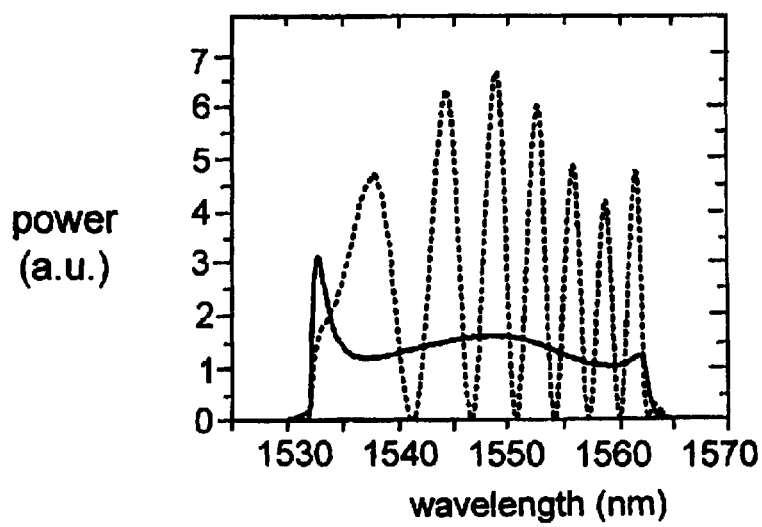
FIG. 10(b) is a graph showing a laser pulse spectrum and interference between continuum generated by consecutive light pulses from the laser source in FIG. 2.

To measure degradation of coherence in the continuum generation process, successive pulses in the pulse train must initially start out in a coherent state. The solid line in FIG. 10(b) shows the wavelength spectrum of the laser output light pulses, and the dashed line shows spectral fringes after the intensity in the two arms of the interferometer 50 was equalized. The fringe visibility is equal to one (i.e., the minima go to zero), thus demonstrating coherence between the successive pulses in the pulse train.

An interference spectrum of two successively generated continua from the hybrid HNLF at 1 mW input power, is shown in FIG. 11(a). Clear interference fringes are observed. The dispersive nature of the interferometer means that the fringe spacing is a strong function of wavelength, however, causing fringes in the wings of the spectrum to oscillate too quickly to be resolved even though zero delay occurs near the center of the spectrum. High resolution measurements of the interference fringes around 1475 nm and 1600 nm wavelengths are shown in FIGS. 11(b) and 11(c). The measured fringe visibility is one over the entire length of the continuum.

Figure 12:
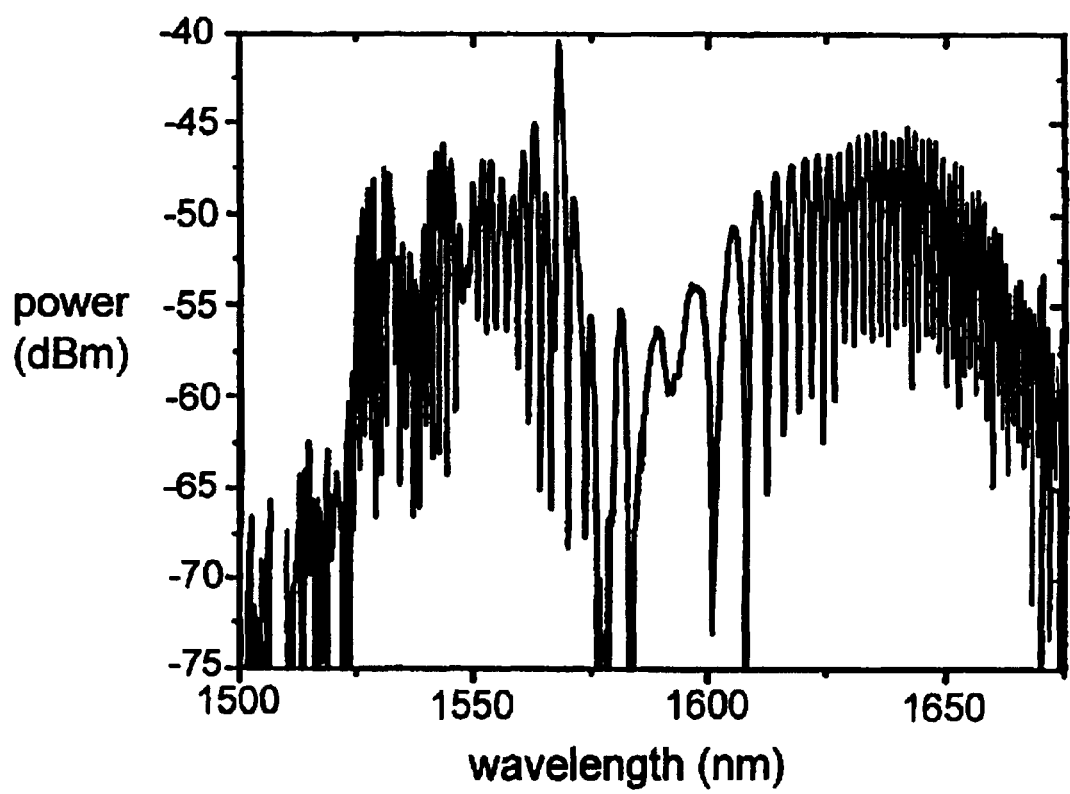
FIG. 12 shows an interference spectrum of continuum generated in a 10 meter length of positive dispersion HNLF at a launch power of one milliwatt (0 dBm).

High fringe contrast between independent spectra is observed as well for continua generated in the constant positive dispersion fiber. The interference spectrum for continua from the constant D=+3.8 ps/nm-km fiber is shown in FIG. 12. Again, a fringe visibility of one is observed over the whole wavelength range. This result is in marked contrast with coherence measurements when generating of continua by applying pulses of picosecond duration to kilometer lengths of dispersion shifted fiber, wherein almost complete degradation of coherence occurs even though the continuum is generated over a bandwidth of only 80 nm.

Continuum generation in a highly non-linear fiber, using a passively modelocked fiber laser source 10 to generate light pulses of femtosecond duration, has been described above. Accordingly, an all fiber, diode pumped device was used in the generation process, and the device is very compact and stable. Substantial spectral broadening (over 700 nm) was obtained using an average power of 7 mW in a ten meter length of HNLF.

Although the hybrid HNLF was four meters shorter than the overall lengths of other, constant dispersion HNLFs used in the experiments, the continuum generated from the hybrid HNLF was significantly broader. In addition, at a low launch power of 1 mW, the continuum from the hybrid fiber remained symmetric about the wavelength of the launch pulses, and relatively flat.

Measured amplitude stability of the continuum for the hybrid HNLF was highly satisfactory, and limited primarily by an unstabilized, environmentally sensitive laser cavity design. The high average power as compared to broadband sources such as edge light emitting diodes (ELEDs) typically used for characterization, and the low noise of the continuum make it ideal for applications such as fiber Bragg grating characterization where high resolution measurements are required.

Electrical spectrum and cross correlation measurements both showed no measurable degradation in mode structure and coherence properties of the pulse train. The coherence properties of the continuum generated in the ten meter lengths of constant dispersion HNLF by femtosecond pulses, may be compared to continuum generated by launching pulses of picosecond duration into kilometer lengths of dispersion shifter fiber. In the latter instance, coherence is (i) fully maintained only in normal dispersion fiber, (ii) partially maintained in dispersion decreasing fiber, suffering degradation away from the generating pulse wavelength, and (iii) almost totally lost when the continuum is generated in anomalous dispersion fiber. By contrast, when applying pulses of femtosecond duration to the present hybrid HNLF, coherence is maintained over the entire range of the generated continuum.

The supercontinuum generated by the present hybrid HNLF has a number of attractive features. For example;

A. At an appropriate pump power level, the continuum is generated symmetrically about the wavelength of the launched light pulses.

B. At an appropriate pump power level, the continuum is flat and featureless.

C. The continuum shows excellent amplitude stability and does not exhibit increased timing jitter.

D. The continuum covers the entire range of wavelengths of present interest in communication systems, viz., the S, C, L, and extended L bands.

With an appropriate pump pulse repetition rate, the continuum is suitable for use, for example, in the following applications:

1. As a low noise source for spectral slicing applications. Many WDM signal sources potentially can be replaced with a single femtosecond laser and continuum generating module according to the invention.

2. As a high power, low noise light bulb for characterizing devices. Currently, devices such as ELEDs are often used to measure grating or fiber transmission. The present continuum source has an average power that may be as much as 15 to 20 dB higher than that of an ELED, and with low noise. Further, the present continuum source can be used to measure device dispersion using a spectral interferometry technique.

3. Octave spanning continuum are currently of interest as sources of high precision optical combs in the fields of precision spectroscopy and frequency metrology. An all fiber, octave spanning supercontinuum source such as disclosed herein may also enable the production of a compact all fiber optical clock.

4. High power, low noise light sources such as disclosed herein are also of interest in the field of optical coherence microscopy.

While the foregoing description represents a preferred embodiment of the invention, it will be obvious to those skilled in the art that various modifications may be made without departing from the spirit and scope of the invention pointed out by the following claims.

For example, while the dispersion of each section of HNLF in the present hybrid fiber may possess a known dispersion at the wavelength of the launched light pulses which is substantially constant along the length of the fiber section, the dispersion of one or more of the HNLF sections may vary within known limits and in a known manner between the input and the output ends of the fiber section so as to obtain a desired characteristic in the generated spectrum.

Further, although the HNLF sections of the hybrid fiber disclosed herein are joined so that their dispersions decrease in order from the input end to the output end of the fiber, the order in which the sections are connected may also be selected to realize a desired feature in the supercontinuum generated by the overall fiber.

Also, experiments showed that the coherence and noise properties of the continuum were degraded for launch pulses with a FWHM duration of around two picoseconds. Because coherence properties of the generated continuum will only tend to improve with shorter pulse widths, it is preferred that the launch pulses not exceed a pulse width of two picoseconds.

We claim:

1. An optical fiber suitable for generation of a supercontinuum spectrum at an output end of the fiber when pulses of light at a certain wavelength from a light source are launched into an input end of the fiber, comprising:

a plurality of optical fiber sections each formed of highly non-linear fiber (HNLF) and having a zero dispersion wavelength that is within +/−200 nanometers (nm) of said certain wavelength, and each of the fiber sections has a different dispersion at said certain wavelength; and each of the fiber sections has an effective area ($A_{eff}$) of between 5 $\mu m^2$ and 15 $\mu m^2$ at said certain wavelength, a dispersion slope of between −0.04 ps/nm$^2$-km and 0.04 ps/nm$^2$-km at said certain wavelength, and a nonlinear propagation coefficient ($\gamma$) of at least 5 W$^{-1}$ km$^{-1}$; and the fiber sections are operatively connected in series with one another from the input end of the fiber to the output end of the fiber.

2. An optical fiber according to claim 1, wherein the fiber sections are fusion spliced to one another.

3. An optical fiber according to claim 1, wherein the fiber sections are connected to one another so that the dispersions of the fiber sections successively decrease in order from the input end to the output end of the fiber.

4. An optical fiber according to claim 1, wherein the fiber has an overall length of about six meters.

5. An optical fiber according to claim 1, including a total of four of said fiber sections.

6. An optical fiber according to claim 5, wherein each of the fiber sections has a length of about 1.5 meters.

7. An optical fiber according to claim 6, wherein the dispersions of the fiber sections are, in order from the input end to the output end of the fiber, approximately +3.8, +2.2, 0, and −6 ps/nm-km.

8. An optical fiber according to claim 1, wherein the supercontinuum spectrum produced at the output end of the fiber spans more than one octave of wavelengths when the energy per pulse of light launched into the input end of the fiber is about three nanojoules at a wavelength of about 1550 nanometers.

9. An optical fiber according to claim 1, wherein one or more of the fiber sections has a dispersion at said certain wavelength that varies within known limits along the length of the fiber section.

10. A supercontinuum source, comprising:

a source of light pulses having a certain wavelength and a known pulse duration and repetition rate;

an optical fiber including a plurality of fiber sections each formed of highly non-linear fiber (HNLF) and having a zero dispersion wavelength that is within +/−200 nanometers (nm) of said certain wavelength, and each of the fiber sections has a different dispersion at said certain wavelength;

each of the fiber sections has an effective area ($A_{eff}$) of between 5 $\mu m^2$ and 15 $\mu m^2$ at said certain wavelength, a dispersion slope of between −0.04 ps/nm$^2$-km and 0.04 ps/nm$^2$-km at said certain wavelength, and a nonlinear propagation coefficient ($\gamma$) of at least 5 W$^{-1}$ km$^{-1}$;

the fiber sections are operatively connected in series with one another from an input end of the fiber to an output end of the optical fiber; and the input end of the optical fiber is operatively connected to the source of light pulses.

11. A supercontinuum source according to claim 10, wherein the source of light pulses comprises a fiber laser.

12. A supercontinuum source according to claim 11, wherein the input end of the optical fiber is fusion spliced to an output of the fiber laser.

13. A supercontinuum source according to claim 10, wherein the duration of the light pulses from said source is not more than two picoseconds.

14. A supercontinuum source according to claim 10, wherein the light pulses from said source have a full width half maximum (FWHM) duration of about 188 femtoseconds (fs).

15. A supercontinuum source according to claim 10, wherein a supercontinuum spectrum generated at the output end of the optical fiber spans more than one octave of wavelengths when each of the light pulses from said source has an energy of about three nanojoules at a wavelength of about 1550 nanometers.

16. A supercontinuum source according to claim 10, wherein the sections of the optical fiber are connected to one another so that the dispersions of the sections successively decrease in order from the input end to the output end of the optical fiber.

17. A supercontinuum source according to claim 10, wherein one or more of the sections of the optical fiber has a dispersion at said certain wavelength that varies within known limits along the length of the section.

* * * * *